3,066,118
CROSS-LINKED CARBOXYLIC POLYMERS OF TRIALLYL CYANURATE AND ALKENOIC ACIDS
John F. Jones, Cuyahoga Falls, Ohio, assignor to The B. F. Goodrich Company, New York, N.Y., a corporation of New York
No Drawing. Filed May 8, 1958, Ser. No. 733,840
5 Claims. (Cl. 260—77.5)

This invention relates to cross-linked water swellable carboxylic polymers and more particularly pertains to interpolymers of alpha-beta olefinically unsaturated monocarboxylic acids and triallyl cyanurate and method for preparing same.

This application is a continuation in part of the application of John F. Jones, Serial No. 404,784, filed January 18, 1954, now Patent 2,985,625, issued May 23, 1961.

I have discovered that highly useful carboxylic polymers are obtained when a carboxylic monomer such as acrylic acid is copolymerized with certain proportions of triallyl cyanurate. The resulting polymers are substantially insoluble in water and in most common organic solvents. Depending upon the proportion of the triallyl cyanurate utilized, however, the polymers vary considerably in properties. With only 0.1 to 8% and preferably 0.5 to 6% by weight of the triallyl cyanurate, insoluble gel-like polymers are obtained which per se, and especially in the form of their alkali metal and ammonium salts, have the ability to absorb large quantities of water with consequent many times increase in volume. Such polymers somewhat resemble, but are greatly superior to, gum tragacanth, gum karaya and other naturally occurring more or less insoluble gum-like substances conventionally used as bodying and suspending agents. The high swelling polymers of this invention are extremely useful in various musilaginous or colloidal gel-like applications such as dentrifrices, creams, ointments and printing paste thickeners.

In the production of the polymers of this invention I employ a monomeric mixture which contains the two essential monomeric ingredients, each in certain proportions, one being a monomeric alpha-beta olefinically unsaturated monocarboxylic acid such as acrylic acid and the other being triallyl cyanurate. The preferred carboxylic monomers for use in this invention are the monoolefinic acrylic acids having the general structure

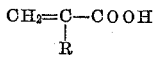

wherein R represents hydrogen, halogen, a cyano group, monovalent alkyl radicals, monovalent aryl radicals, monovalent aralkyl radicals, monovalent alkaryl radicals and monovalent alicyclic radicals. Illustrative acrylic acids of this preferred type are acrylic acid, methacrylic acid, ethacrylic acid, chloro acrylic acid, bromo acrylic acid, cyano acrylic acid, alpha-phenyl acrylic acid, alpha-benzyl acrylic acid, alpha-cyclohexyl acrylic acid, and others. Of this class acrylic acid itself is most preferred because of its generally lower cost, ready availability, and ability to form superior polymers.

The polymers of this invention are most preferably made by polymerization in an inert diluent having some solubilizing action on one or more of the monomeric ingredients but substantially none on the resultant polymer. Polymerization in bulk may be employed but, however, is not preferred because of the difficulty in working up the solid polymeric masses obtained. Polymerization in an aqueous medium containing a water-soluble free-radical catalyst is useful, the product being obtained either as a granular precipitate or as a highly swollen gel, either of which may be used directly or may easily be subdivided and dried. Polymerization in an organic liquid which is a solvent for the monomers but a non-solvent for the polymers, or in a mixture of such solvents, in the presence of a solvent soluble catalyst is most preferred because the product is usually obtained as a very fine friable and often fluffy precipitate which, after solvent removal, seldom requires grinding or other further treatment before use. Suitable solvents for the latter method include benzene, xylene, tetralin, hexane, heptane, carbon tetrachloride, methyl chloride, ethyl chloride, bromo trichloromethane, and others, and mixtures of these and other solvents.

Polymerization in the diluent medium may be carried out in the presence of a free-radical catalyst in a closed vessel in an inert atmosphere and under autogenous pressure or artificially induced pressure or in an open vessel under reflux at atmospheric pressure. The temperature of the polymerization may be varied from 0° C. or lower to 100° C. or higher, more preferably from 20 to 90° C., depending on the molecular weight desired.

Suitable free-radical catalysts include per-oxygen compounds such as sodium, potassium and ammonium persulfates, caprylyl peroxide, benzoyl peroxide, hydrogen peroxide, pelargonyl peroxide, cumene hydroperoxide, tertiary butyl diperphthalate, tertiary butyl perbenzoate, sodium peracetate, sodium percarbonate, and the like as well as azo-diisobutyronitrile and the so-called "redox" type of catalyst and the heavy-metal activated catalyst systems.

These high-swelling polymers generally do not attain their maximum volume in water until converted to a partial alkali, ammonium or amine salt. As the percent neutralization is increased, the ratio of volume in distilled water to unit weight increases. Neutralization to the extent of 75% produces a pH of about 7.0. The neutralizing agent is preferably a monovalent alkali such as sodium, potassium, lithium or ammonium hydroxide or the carbonates and bicarbonates thereof, or mixtures of the same, and also amine bases having not more than one primary or secondary amine groups. Polyvalent bases such as calcium hydroxide, and in fact any polyvalent metal cation, have a strong deswelling action on the water-swollen polymers and their salts, although their absolute swell notwithstanding the presence of these polyvalent metal ions is higher than that of the naturally occurring gum-like materials such as gum tragacanth and the like in the presence of the same deswelling agents. It is sometimes desirable, because of the effect on the viscosity and thixotropy of the water-swollen polymer gels, to neutralize the polymer with up to 25% of a polyvalent metal base such as calcium hydroxide and the like.

In the following illustrative example the amounts of ingredients are expressed in parts by weight unless otherwise indicated and the viscosities were determined with a Brookfield viscometer and the values are given in poises.

*Example*

Acrylic acid-triallyl cyanurate copolymers were prepared at 50° C. under a nitrogen atmosphere from the following recipe:

| | |
|---|---|
| Acrylic acid | 94–99 |
| Triallyl cyanurate | 1–6 |
| Benzoyl peroxide | 2 |
| Benzene | 880 |

High conversions were obtained in 8 hours. The polymers were isolated by suction filtration and they were dried at 50° C. in a circulating air oven. Mucilages were prepared by mixing 1.5 grams of polymer in 100 grams of distilled water which contained sufficient sodium hydroxide to give a pH of about 7 to the final mucilage.

| Parts Triallyl Cyanurate | 1.5% Conc. | Viscosities | |
|---|---|---|---|
| | | 1.0% | 0.5% |
| 1 | 304 | 264 | 208 |
| 2 | 1,680 | 1,440 | 522 |
| 4 | 600 | 240 | 28 |
| 5 | 80 | 58 | 0 |
| 6 | 120 | 16 | 0 |

The 0.5% mucilage of the above polymer having 1 part triallyl cyanurate is an excellent thickening and suspending vehicle for a water-in-oil pigment based textile printing ink.

It is obvious that many changes and modifications can be made in the above-described details without departing from the nature and spirit of this invention, therefore it is to be understood that the invention is not limited to said details except as set forth in the appended claims.

The embodiments of the invention in which an exclusive property or privilege is claimed are defined as follows:

1. The resinous water-swellable copolymer of the monomeric mixture consisting of an acid having the structure

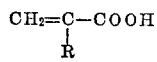

wherein R is a member of the class consisting of hydrogen and a methyl group and from 1 to 6 parts by weight based on 100 parts by weight of combined monomers of triallyl cyanurate said copolymer having a viscosity of at least 16 poises in distilled water at pH about 7 at a 1% by weight copolymer concentration.

2. The resinous water-swellable copolymer of the monomeric mixture consisting of acrylic acid and from 1 to 6 parts by weight based on 100 parts by weight of combined monomers of triallyl cyanurate said copolymer having a viscosity of at least 16 poises in distilled water at pH about 7 at a 1% by weight copolymer concentration.

3. The method for preparing a resinous water-swellable copolymer of the monomeric mixture consisting of acrylic acid and from 1 to 6 parts by weight based on 100 parts by weight of combined monomers of triallyl cyanurate said method comprising conducting the polymerization in a liquid organic solvent for the monomers at from 20° C. to 100° C. in an inert atmosphere in the presence of a free-radical initiator.

4. The method of claim 3 wherein the liquid solvent is benzene.

5. The method of claim 3 wherein the free-radical initiator is benzoyl peroxide.

References Cited in the file of this patent

UNITED STATES PATENTS

| | | |
|---|---|---|
| 2,475,846 | Lundberg | July 12, 1949 |
| 2,510,503 | Kropa | June 6, 1950 |
| 2,745,813 | Logemann et al. | May 15, 1956 |
| 2,768,991 | Schnell et al. | Oct. 30, 1956 |
| 2,801,985 | Roth | Aug. 6, 1957 |
| 2,923,692 | Ackerman et al. | Feb. 2, 1960 |
| 2,934,525 | Fekete | Apr. 26, 1960 |
| 2,985,625 | Jones | May 23, 1961 |

OTHER REFERENCES

Schildknecht: Polymer Processes, Interscience (1956), pages 175–190.